Oct. 7, 1958

J. R. STARRETT ET AL 2,854,809

BALER FEED MECHANISM

Filed March 25, 1954

INVENTORS.
JAMES R. STARRETT
PAUL A. LUTHMAN
GEORGE McCONEGHY, JR.

BY M. W. Green

ATTORNEY.

Oct. 7, 1958  J. R. STARRETT ET AL  2,854,809
BALER FEED MECHANISM
Filed March 25, 1954  11 Sheets-Sheet 2
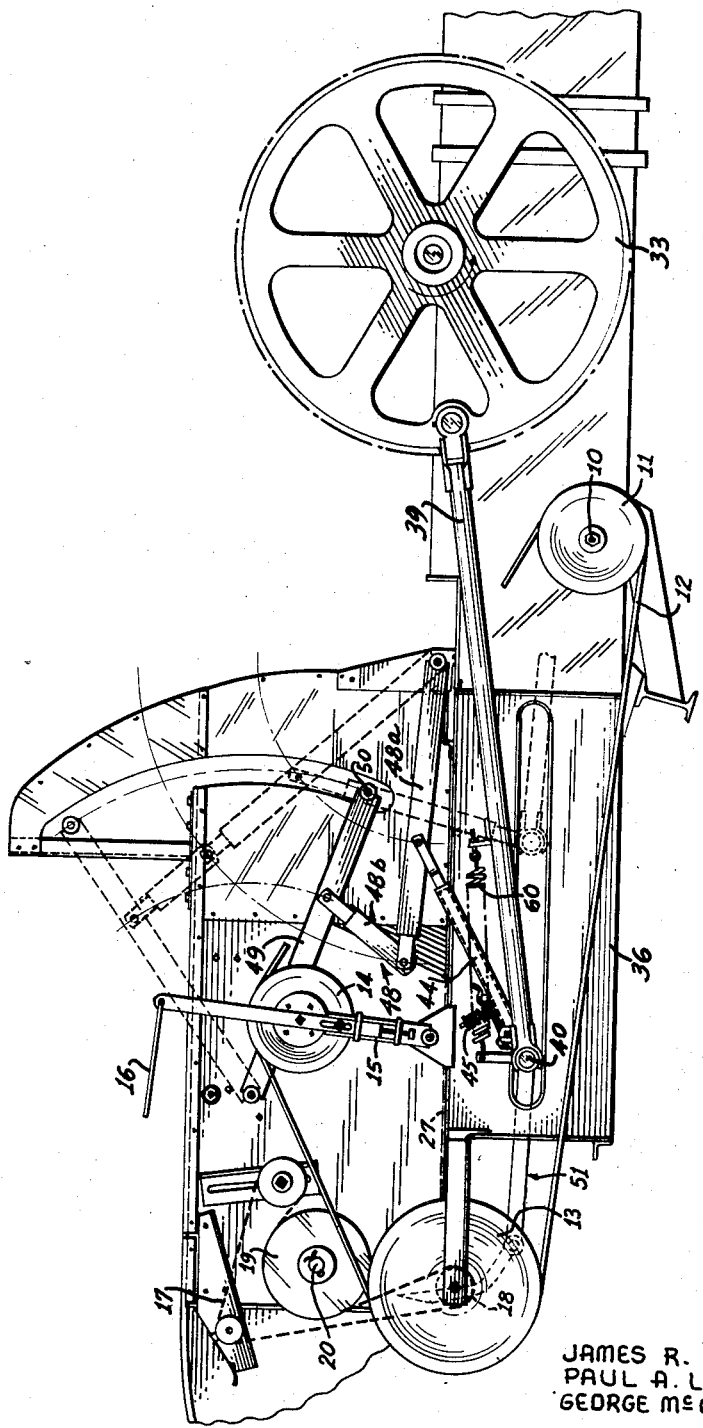
INVENTORS.
JAMES R. STARRETT
PAUL A. LUTHMAN
GEORGE McCONEGHY, JR.
BY
ATTORNEY.

Oct. 7, 1958   J. R. STARRETT ET AL   2,854,809
BALER FEED MECHANISM
Filed March 25, 1954   11 Sheets-Sheet 3

INVENTORS.
JAMES R. STARRETT
PAUL A. LUTHMAN
GEORGE McCONEGHY, JR.
BY
ATTORNEY

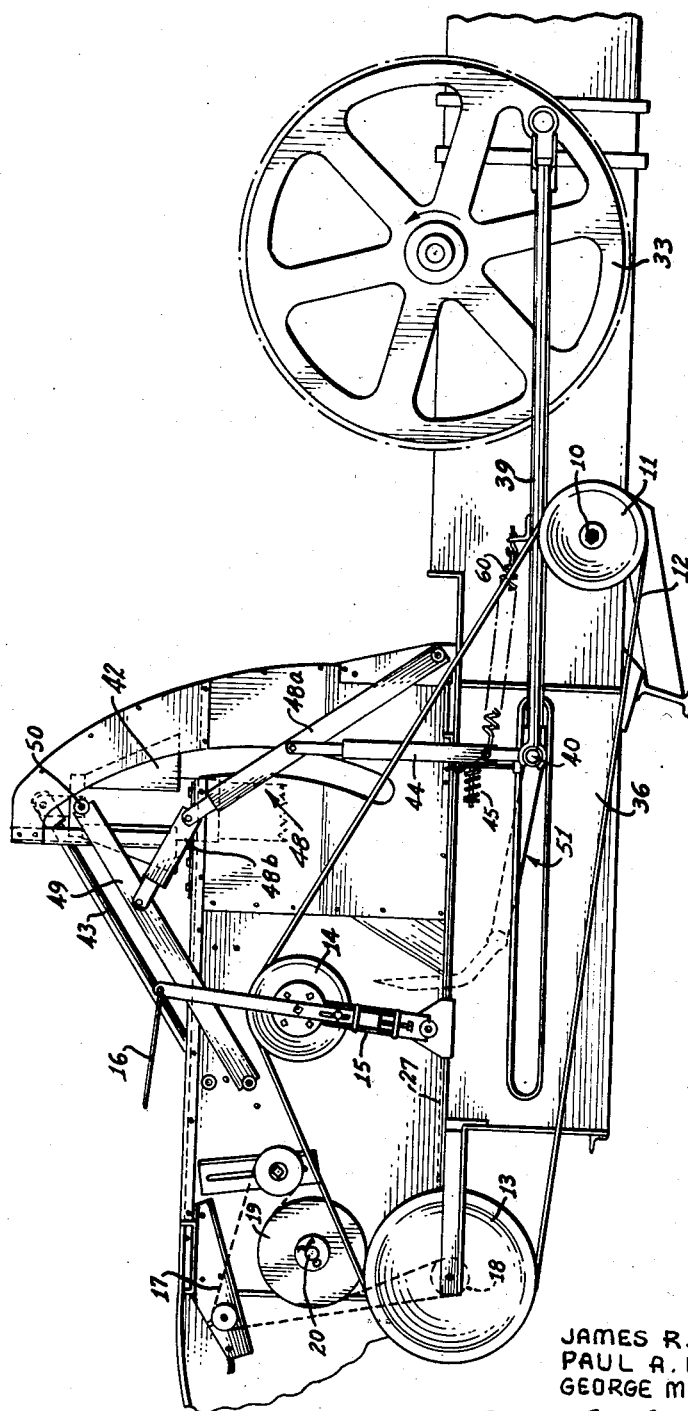

Oct. 7, 1958  J. R. STARRETT ET AL  2,854,809
BALER FEED MECHANISM
Filed March 25, 1954  11 Sheets-Sheet 5

INVENTORS.
JAMES R. STARRETT
PAUL A. LUTHMAN
GEORGE McCONEGHY, JR.
BY
ATTORNEY.

Oct. 7, 1958  J. R. STARRETT ET AL  2,854,809
BALER FEED MECHANISM
Filed March 25, 1954  11 Sheets-Sheet 6
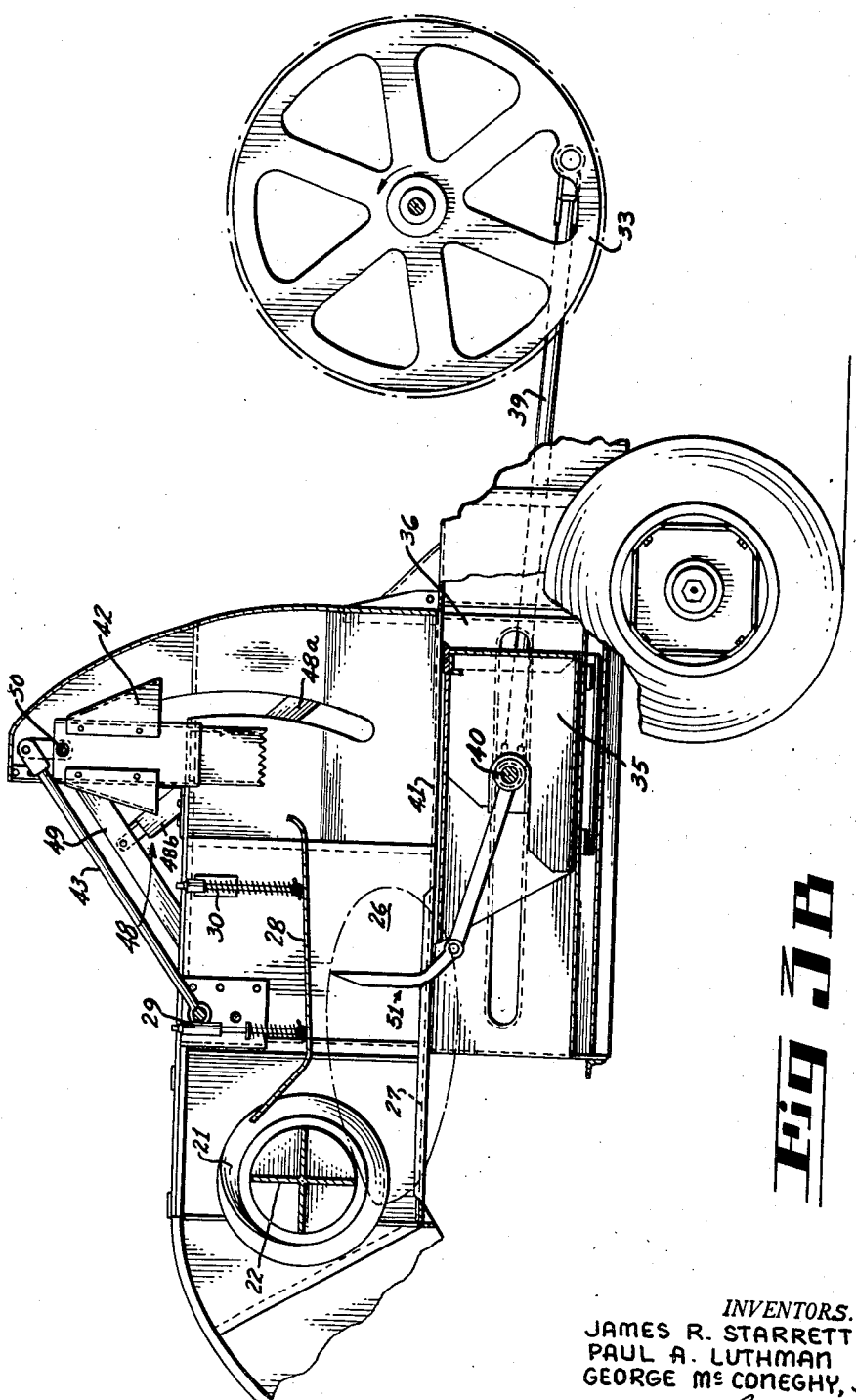
INVENTORS.
JAMES R. STARRETT
PAUL A. LUTHMAN
GEORGE McCONEGHY, JR.
BY
ATTORNEY.

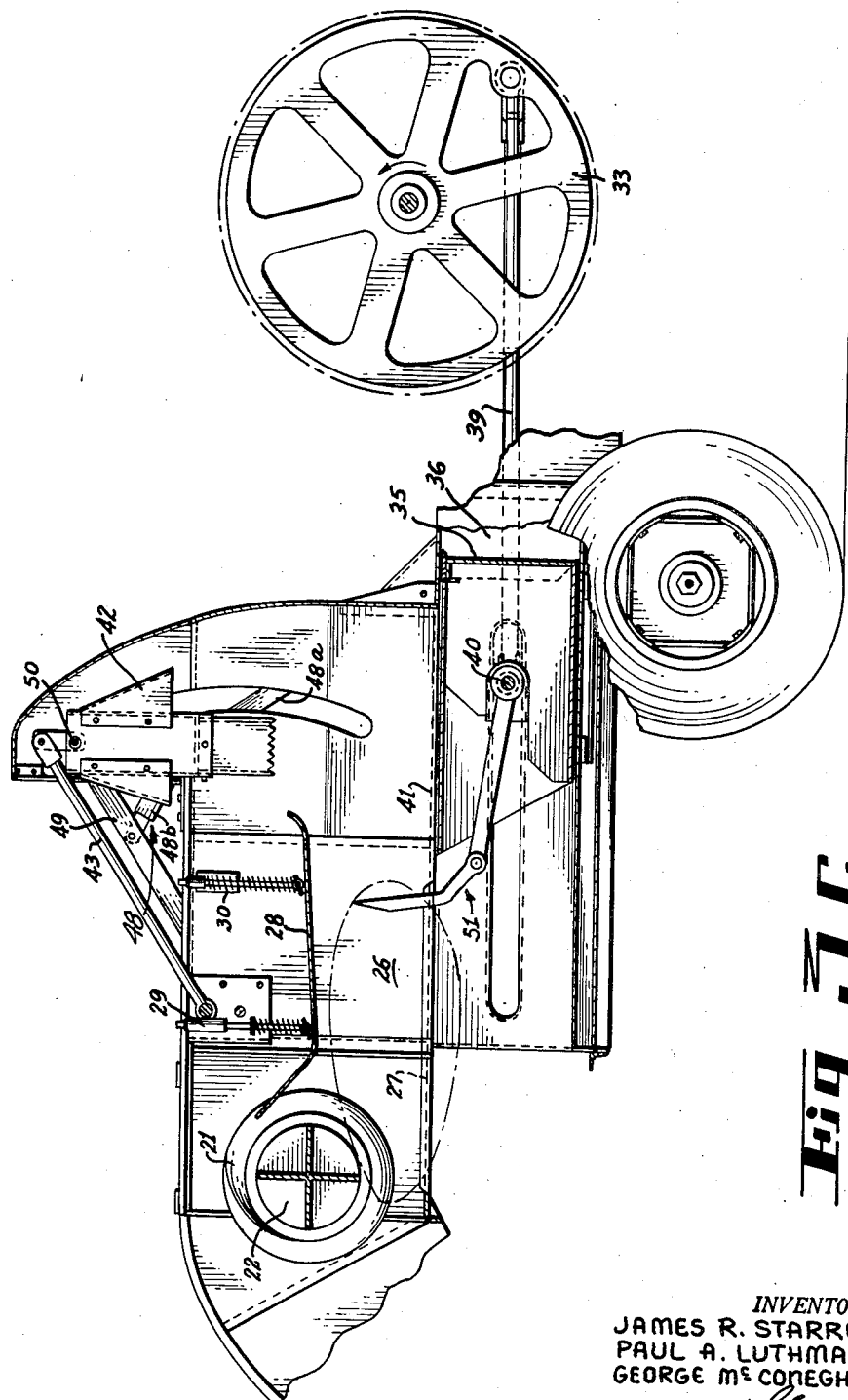

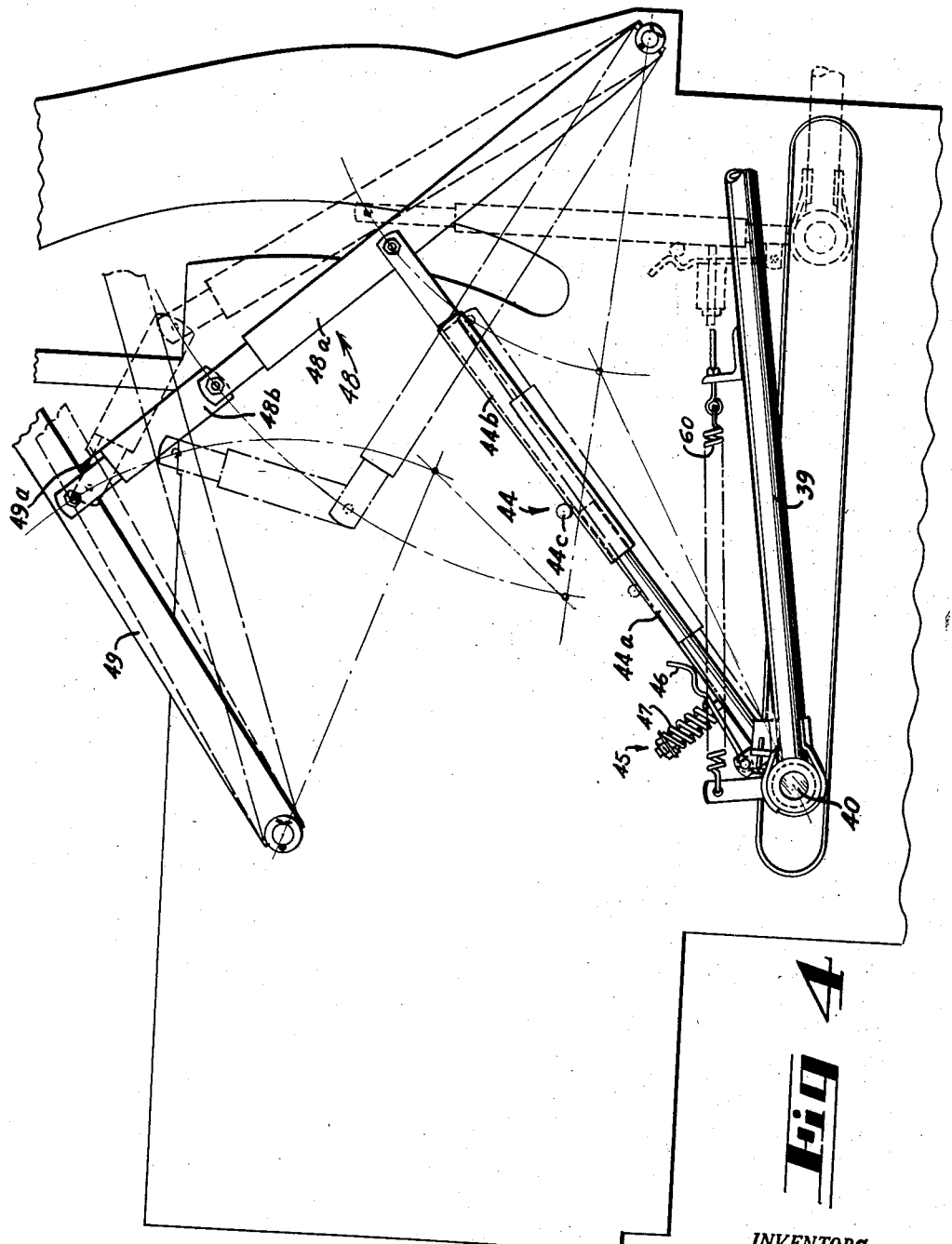

Oct. 7, 1958   J. R. STARRETT ET AL   2,854,809
BALER FEED MECHANISM
Filed March 25, 1954   11 Sheets-Sheet 9

INVENTORS.
JAMES R. STARRETT
PAUL A. LUTHMAN
GEORGE MC CONEGHY, JR.

BY
ATTORNEY.

Oct. 7, 1958 J. R. STARRETT ET AL 2,854,809
BALER FEED MECHANISM
Filed March 25, 1954 11 Sheets-Sheet 11
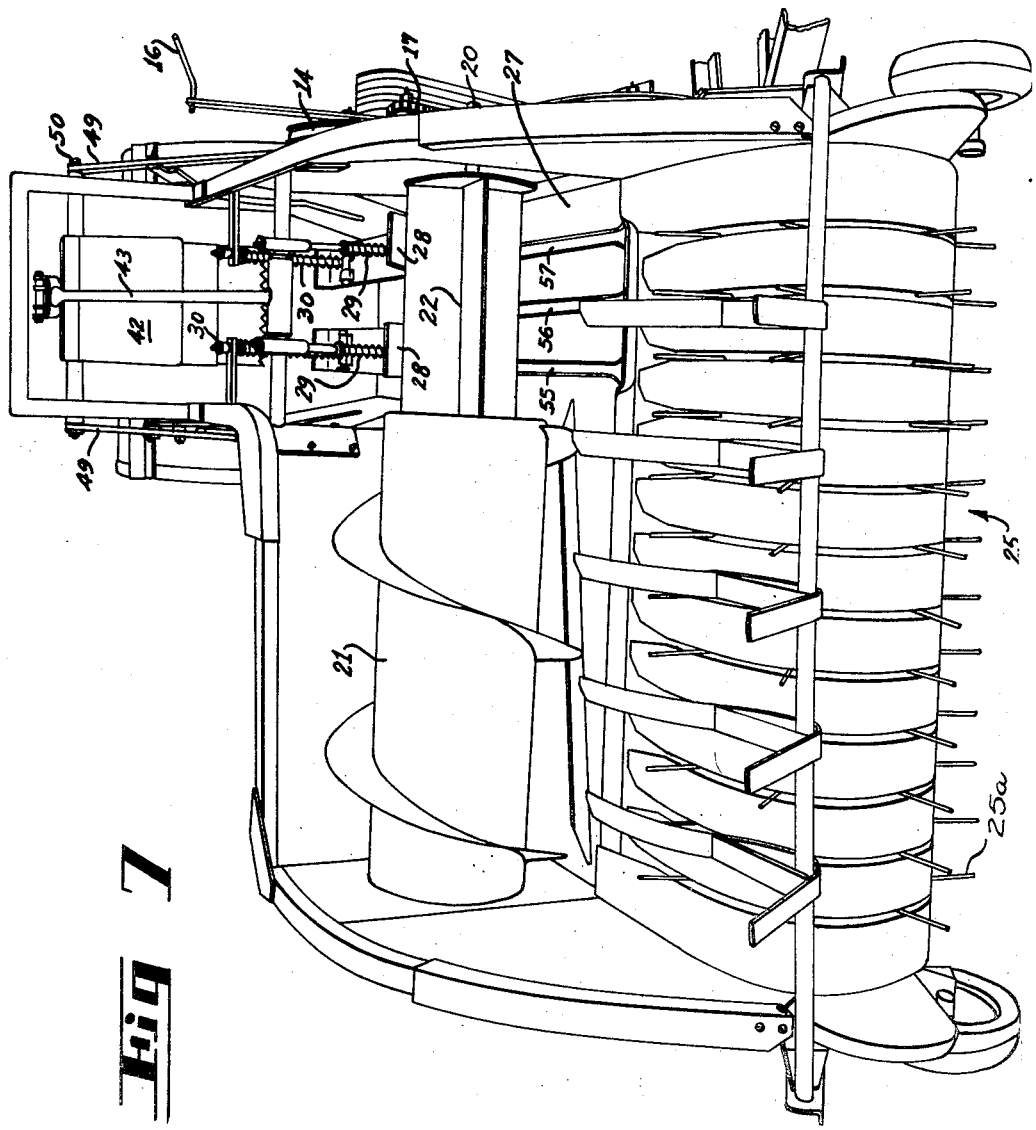
INVENTORS.
JAMES R. STARRETT
PAUL A. LUTHMAN
GEORGE McCONEGHY, JR.
BY
ATTORNEY.

United States Patent Office 2,854,809
Patented Oct. 7, 1958

2,854,809

BALER FEED MECHANISM

James R. Starrett, Coldwater, Paul A. Luthman, Maria Stein, and George McConeghy, Jr., Celina, Ohio, assignors to Avco Manufacturing Corporation, Cincinnati, Ohio, a corporation of Delaware Application March 25, 1954, Serial No. 418,564

14 Claims. (Cl. 56—341)

This invention relates to balers for agricultural use and more particularly to baler feed mechanism especially applicable to so-called field pickup balers designed to be drawn behind a tractor over a field and to pick up hay or other crop material and to bale it immediately after pick up, the completed bales being either dropped on the ground behind the baler or loaded upon a wagon hitched behind the baler.

In the development of field pickup balers there has been a continuous effort to improve their efficiency and to assure their effective operation as an automatic unit requiring the attention of only one man, the tractor operator, to satisfactorily complete the baling of crop material such as hay even though there may be considerable variation in the properties of the material fed to the baler, the terrain over which the unit is drawn, as well as variation in the rate of pick up and consequent change in amount of material fed to the baler. Because of such variations, therefore, it is important that feeding mechanism for a baler of this type be adaptable to operate satisfactorily under normal variation in load within reasonable limits and outside such limits such as a major overload or obstruction of foreign objects which may be picked up in a field, to provide for automatic or near automatic compensation to assist in returning the operation to normal or to minimize the effect of overload or obstruction, all without damage to the mechanism and with a minimum of attention from the operator and without excessive loss of time from the job.

It is therefore a primary object of this invention to provide baler feed mechanism capable of improved uniformity in feed of material to the bale chamber under variation in conditions to be expected in the field.

It is another object to provide a feed mechanism capable of feeding material with relative uniformity thru a transfer chamber adjacent a bale chamber with feeding assisted by mechanism carried by the reciprocating plunger of the baler.

It is a further object to provide a linkage mechanism for operation of a feed ram operated from the reciprocating plunger of the baler and capable of variation in speed of travel during the cycle of movement such that time is provided to feed material under the feed ram for suitable uniformity and the further assurance of proper timing in the movement of the feed ram relative to the movement of the bale plunger.

It is a further object to provide resilient release mechanism operable with the feed ram and the transfer chamber feeding fork reciprocating with the bale plunger so designed to release on predetermined overload or obstruction and to automatically return to normal operation when the obstruction or overload is removed.

It is another object to provide mechanism to generally improve the operation and feed in a baler having compactness and economy of mechanism thru dual use of parts to accomplish necessary functions with consequent improvement in efficiency and economy of manufacture.

The above and other objects of the invention will appear more fully from the following more detailed description and by reference to the accompanying drawings forming a part hereof and wherein:

Fig. 1 is a side view of a complete baler showing certain of the drive mechanism and some of the essential parts of the feed mechanism.

Fig. 2A is a side view showing bull gear and connecting rod drive for reciprocating the bale plunger on one side of the baler, as well as the linkage mechanism driven by reciprocation of the connecting rod and bale plunger for controlling the movement of the feed ram. The linkage is shown in position corresponding to the maximum downward position of the feed ram, with the maximum upward position shown dotted.

Fig. 2C is a view similar to Figs. 2A and 2B but shows the position of the linkage, connecting rod, and bull gear when the linkage is in an over-center position showing the arrangement of mechanism for assuring a dwell in the movement of the feed ram near its maximum upward movement.

Fig. 3A is a vertical longitudinal cross section thru the center of the baler showing, feed ram, transfer chamber, feeding fork, plunger, connecting rod and bull gear positions when the feed ram is in its maximum down position, the position corresponding to Fig. 2A.

Fig. 3B is a view similar to Fig. 3A but shows the parts in position corresponding to Fig. 2B.

Fig. 3C is a view similar to Figs. 3A and 3B but shows the parts in position corresponding to Fig. 2C.

Fig. 7 is a front view of the baler disclosing details of the pickup mechanism, cross feed auger and paddle wheel, as well as the transfer chamber above the bale case.

Figure 1:
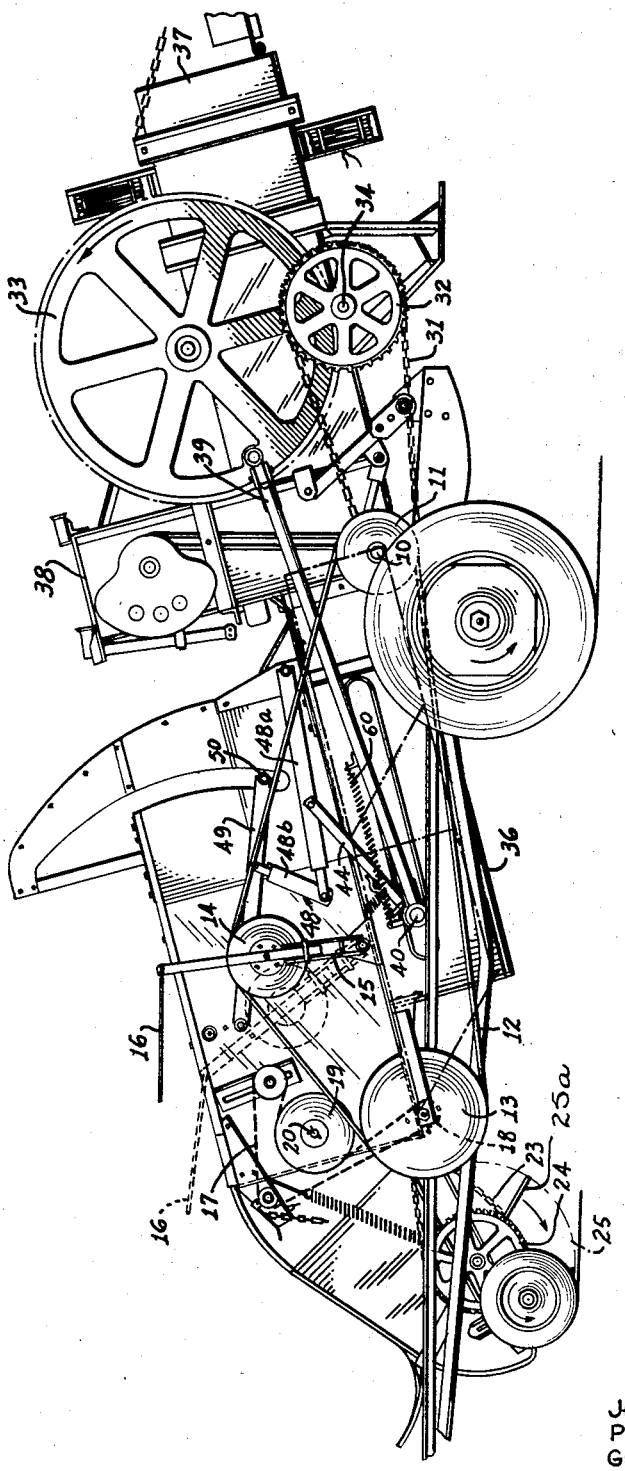

The baler being of a type drawn by a tractor for field pickup of material to be baled has its mechanism driven by a source of power either from a so-called power take-off from the tractor, or by a separate motor carried on the frame of the baler, neither of these sources of power being shown in the drawings but are assumed to be so connected as to effect a clockwise rotation of shaft 10 Fig. 1. This shaft 10 carries a pulley 11 driving a V-belt 12 along pulleys 13 and 14, pulley 13 being a driven pulley and pulley 14 being a belt tightener mounted on a pivoted post 15 swung into and out of belt tightening relationship by a push-pull rod 16 extending forwardly to the tractor seat whereby a pushing movement of post 15 backward, or towards the right as shown in Fig. 1, causes the pulley 14 to tighten the belt 12 into operative driving relationship by the over-center position of post 15, which position is further positively assured by the direction of travel of belt 12 in the direction to hold the pulley 14 over-center as shown. Therefore the driven rotation of pulley 13 causes the chain 17 carried by a sprocket 18 on the backside of pulley 13 to drive a sprocket 19 secured to the shaft 20 of auger 21 with its paddle wheel modified shape 22 at the end thereof shown in the front view of Fig. 7. Pulley 13 also rotates a suitable sprocket (not shown) which drives a chain 23 to a drive 24 for a pickup mechanism 25, the fingers 25a of which are shown in Fig. 1 and the further general arrangement of which is shown in the front view of Fig. 7. The pickup 25 is of the conventional type provided on many types of harvesting and baling mechanism the rotation of which causes the cam controlled fingers to pick up material such as hay from the ground as the baler is pulled forwardly by the tractor. The picked up material will be understood by inspection of front view of Fig. 7 as being carried crosswise by the auger 21 so that the material is moved toward the right as viewed in Fig. 7 until it comes under the paddle wheel portion 22 which is integral with and rotates with auger 21. The paddle wheel 22 gives a downward and backward pressing movement to the hay and causes it to be fed, as will be evident in Fig. 3A, into the transfer chamber 26 above the deck 27 and under the hay hold-down members 28 resiliently mounted as shown in Fig. 3A and Fig. 7 on the spring mountings 29, 30. The further mechanism for transferring the hay or other material to be carried thru the transfer chamber will be described hereinafter.

Proceeding now to a description of the drive for the reciprocating baler plunger and its auxiliary mechanism and referring again to Fig. 1 it is there shown that the clockwise rotation of shaft 10 with suitable sprocket (not shown) being secured behind the pulley 11 drives a chain 31, a sprocket 32, and thru a pinion (not shown) rotates a large bull gear 33 in a counter-clockwise direction as shown in Fig. 1, it being understood that there are two bull gears on the baler, one on each side, each driven by a pinion (not shown) but carried on a shaft 34 rotated by the previously mentioned sprocket 32.

The function of baling the material fed to the baler is accomplished by a reciprocation of a plunger 35 (see Fig. 3A) in a rectangular bale case 36, which case or chamber as will be seen in Fig. 1 extends over a major portion of the length of the baler so that the compacted material initially fed into the top of the bale chamber 36 thru opening 41 (see Fig. 3A) and compacted by the reciprocation of plunger 35 will be forced thru rectangular bale chamber 36 out from the rear opening 37 of the bale chamber at the rear of the baler at which time it will have been suitably tied so that it is retained in rectangular bales intermittently tied by mechanism not forming a part of this invention, but which is disclosed in a copending application S. N. 225,931, filed May 12, 1951, now Patent No. 2,726,598, the tying mechanism being designated herein and shown generally without detailed description at 38 in Fig. 1.

It has been previously stated that the bull gear 33 duplicated on each side of the baler rotates in counter-clockwise direction as shown in Fig. 1 and they are the units which provide the force for reciprocating the baling plunger 35 previously mentioned, the said reciprocating movement of the plunger being effected by means of connecting rods 39 on each side of baler used for the purpose of converting the rotating motion of bull gear 33 into reciprocating motion of plunger 35 by the above mentioned connecting rods 39 secured one to each end of the projecting cross shaft 40 of plunger 35.

It is well to mention that in the baler structure herein disclosed the bull gears are mounted on the rear section of the baler instead of in the front section ahead of the bale case, as is the more common construction. However, with the bull gears mounted rearwardly as herein disclosed the structure is substantially reduced in over-all length as the units are in effect overlapping as is evidenced by the connecting rods, gears, and linkages on the outside of the bale case, as well as the transfer chamber 26 above the bale case which feeds material in effect around and over the top of the bale plunger with novel advantages of dual use of parts of the plunger for feeding mechanism as will later appear.

Figure 4A:
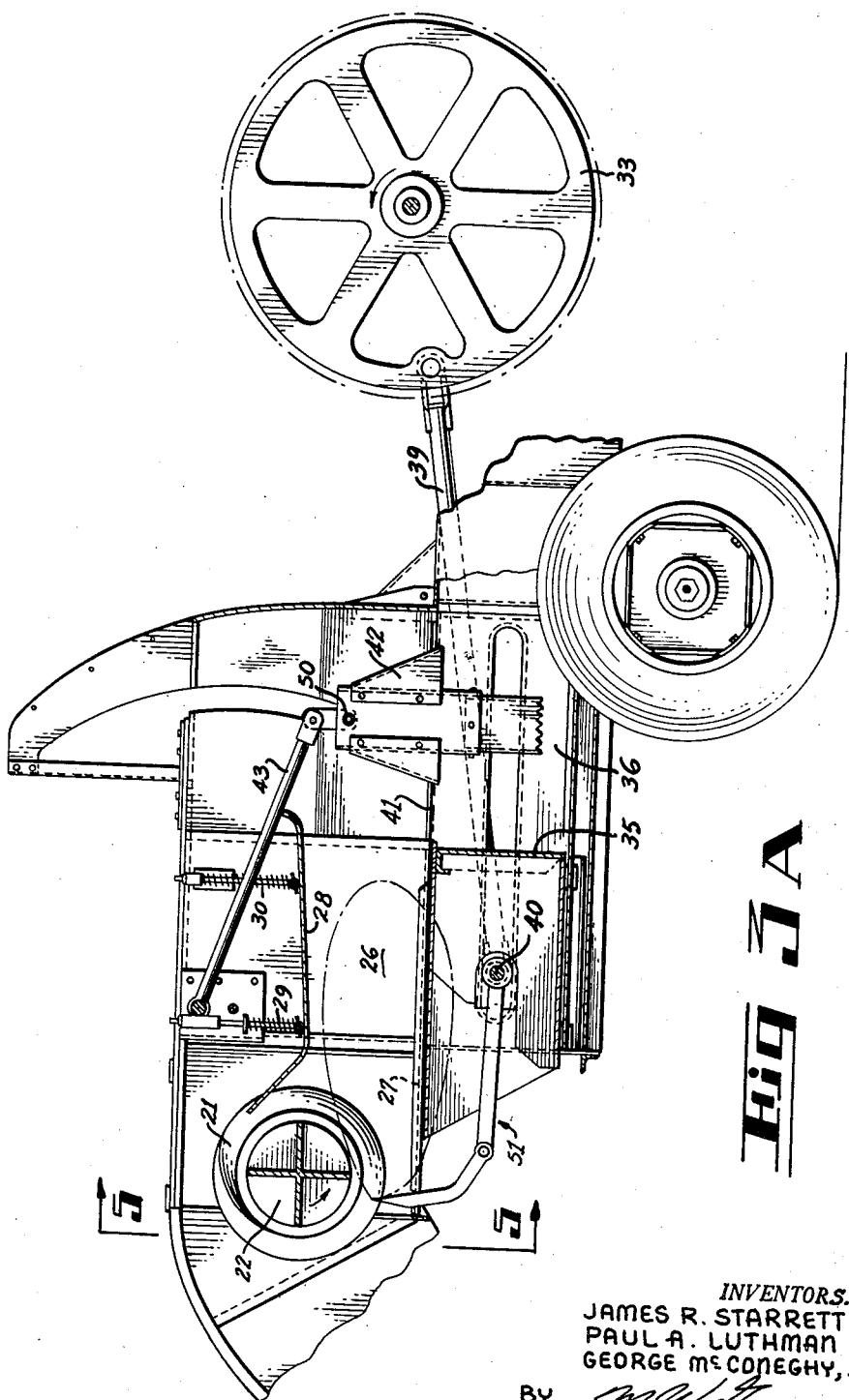
Fig. 4 is an enlarged view showing a portion of the linkage controlling the movement of the feed ram, but showing various positions which may be assumed when the breakaway mechanism is effective when there is an obstruction or overload in the path of the feed ram.
Figure 5:
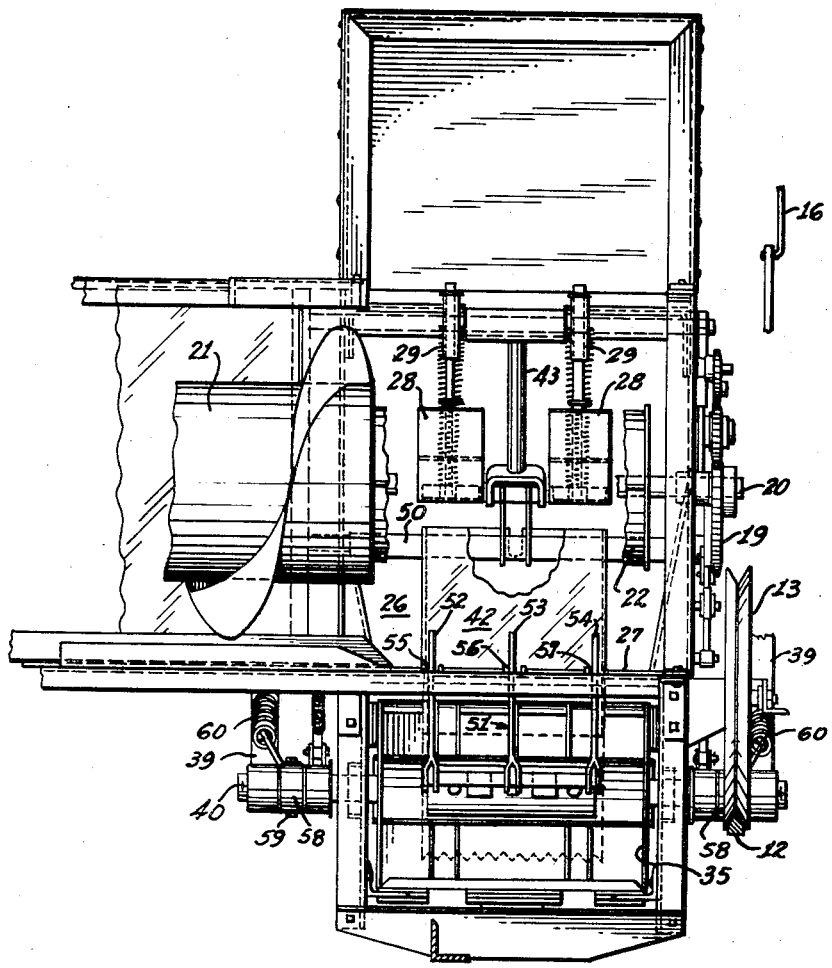
Fig. 5 is an enlarged vertical cross section on the line 5—5 of Fig. 3A.

In order that hay or other material to be baled may be forced from the upper transfer chamber 26 into the bale chamber ahead of the plunger 35 thru opening 41 in the top of chamber 36 a feed ram 42 (see Fig. 3A) is mounted on a stabilizing link 43 for up-and-down reciprocation into and out of the bale chamber 36 thru opening 41 and intermittently passes thru the transfer chamber 26 thereby to intermittently push hay from the transfer chamber 26 into the bale chamber 36 ahead of plunger 35. The linkage for driving this feed ram in its reciprocating movement is an important part of this invention and is duplicated on both sides of baler and is connected to each projecting end portion of the cross shaft 40 of plunger 35. The linkage comprises a telescoping reciprocating link 44 formed of two parts 44A, 44B. The two parts aforesaid being secured in latched engagement by a latching mechanism 45 made up of a latch member 46 pivotally mounted as shown in Fig. 4 and retained by a spring 47 in a direction toward the member 44A so that the latch member 46 will close into latched engagement with a knob 44C carried on the member 44B and will latch therewith when the telescoping member slides together. The telescoping link 44 is connected as previously mentioned to the end of the cross shaft 40 and its opposite end 44B is secured to a two-part link 48 made up of two parts 48A and 48B which together are generally designated as a two-part actuating link. The upper end of link part 48B is secured to an upper actuating link 49 which has one end pivotally mounted on the side of the baler and the opposite end secured at a cross shaft 50 of feed ram 42. By reference to Figs. 1, 2A, 2B and 2C, and the aforesaid description of linkage it is apparent that reciprocation afforded by the connecting rod 39 and the plunger 35 with cross shaft 40 to which the reciprocating link 44 is secured will cause reciprocation of feed ram 42 in an up-and-down movement, but the particular relationship and proportioning of the linkage will produce movement of a nature especially adapted for satisfactory operation as will be more fully disclosed hereinafter.

Figure 6:
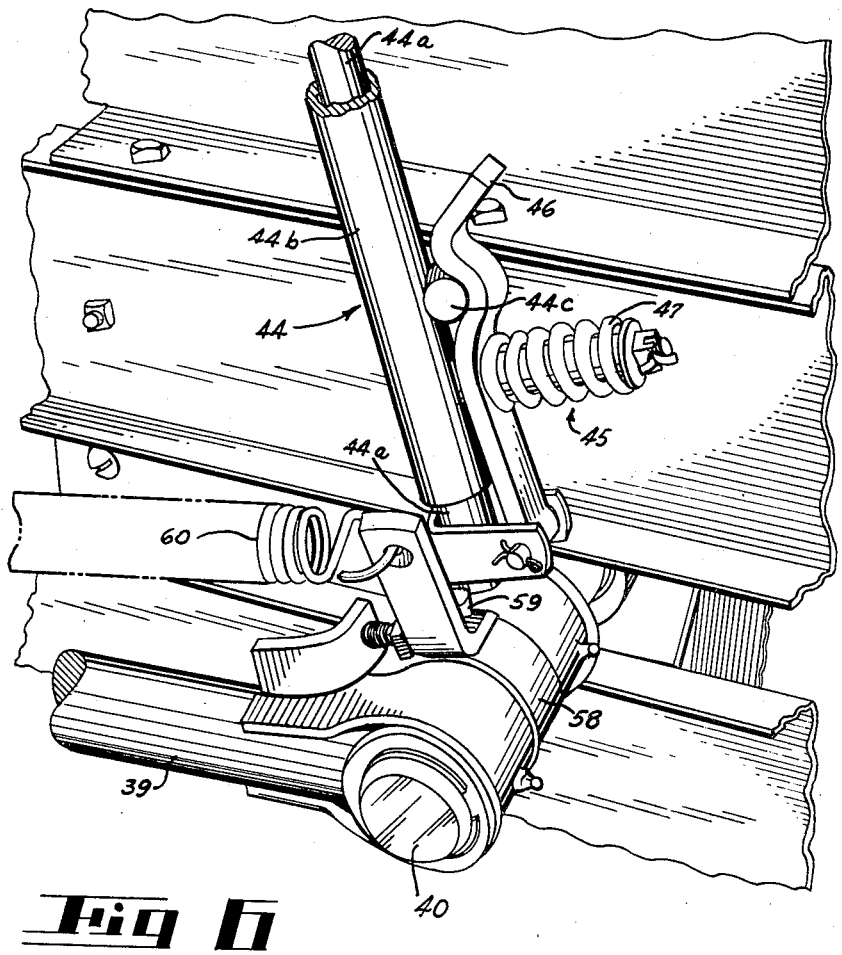
Fig. 6 is an enlarged perspective showing the connection of a connecting rod to the cross shaft of the baler plunger and also shows the lower end of the so-called reciprocating or telescoping link of the feed ram control linkage on one side of the baler.

In order to move the hay or other material to be baled along the transfer chamber from left to right as viewed in Figs. 3A, 3B and 3C, a fork assembly 51 comprising 3 fork members 52, 53 and 54, is secured to the cross shaft 40 of plunger 35, the fork unit as shown in Figs. 3A, 3B, 3C, Fig. 5 and Fig. 7 being formed in a manner such that the forking end thereof will project thru elongated openings 55, 56 and 57 in the deck 27 above the bale chamber 36. However, since the fork 51 is rigidly secured to cross shaft 40 the ends of the fork members will be movable up-and-down with the rotation of shaft 40 which rotation will be apparent from the previous description and on reference to the drawings, particularly Figs. 2A, 2B and 2C. The reciprocation of connecting rod 39 will provide the up-and-down movement of the ends of the fork as the connecting rod is carried along the bull gear 33 and the shaft 40 is caused to follow the varying inclination of connecting rod 39 by a resilient connection shown best in Fig. 6 where it appears that a collar 58 carried around the shaft 40 inside the end of connecting rod 39 is secured to the shaft 40 by a bolt 59. The relationship of connecting rod 39 with the shaft 40 is resiliently held in set angularity by spring 60.

Referring to Figs. 3A, 3B and 3C, the path of travel of fork 51 in the cycle of movement of plunger and connecting rod is shown and it is there apparent that the necessary change in the angularity in the connecting rod 39 during its movement is made use of to actuate the fork 51. Referring to Fig. 3A the position of the parts in that figure shows fork 51 projecting into the transfer chamber 26 a relatively short distance which would be at the beginning of stroke of plunger toward the right as viewed in Fig. 3A carrying with it the fork 51. Inspection of the relative position of the connecting rod in Fig. 3B shows that the bull gear has moved counter-clockwise and carried with it the plunger and also the fork, but in this movement the connecting rod 39 has also tilted in a direction so as to position the fork further into the transfer chamber 26 as well as to move it in a direction to push hay or other material to be baled from left to right as shown in Figs. 3A, 3B and 3C. The orbit of movement of the end of the fork during the complete cycle of the back and forth movement of the plunger and the tilting of the connecting rod and fork is shown in the aforesaid figures and it is evident that in the left to right or baling movement of the plunger and fork, the fork is projected into the transfer chamber while in the opposite stroke of the plunger from right to left the fork is retracted from the transfer chamber 26 and therefore has no contact with the material in the transfer chamber. Therefore, the repeated cycles of movement of the plunger would cause the fork 51 to pull material continuously from left to right in the transfer chamber 26 which is the direction of feed required. It is an important feature of the mechanism that the angularity of the connecting rod is maintained in constant relation with the fork by the fact that collar 58 (Fig. 6) is rigidly secured to the cross shaft 40 and the cross shaft 40 is secured in set angularity to the connecting rod 39, but thru spring 60, and therefore if the fork 51 in its feeding movement in the transfer chamber 26 should hit a solid obstruction or heavy overload then the fork 51 would move against the spring 60 and in effect produce a safety release of the mechanism as long as the obstruction is present. The tension of the spring 60, of course, is such that in normal operations the fork 51 is held in operating relation. However, the mechanism is definitely a safety feature which allows the feeding fork 51 to release against the retention of spring 60 in case an obstruction is encountered.

Figure 2B:
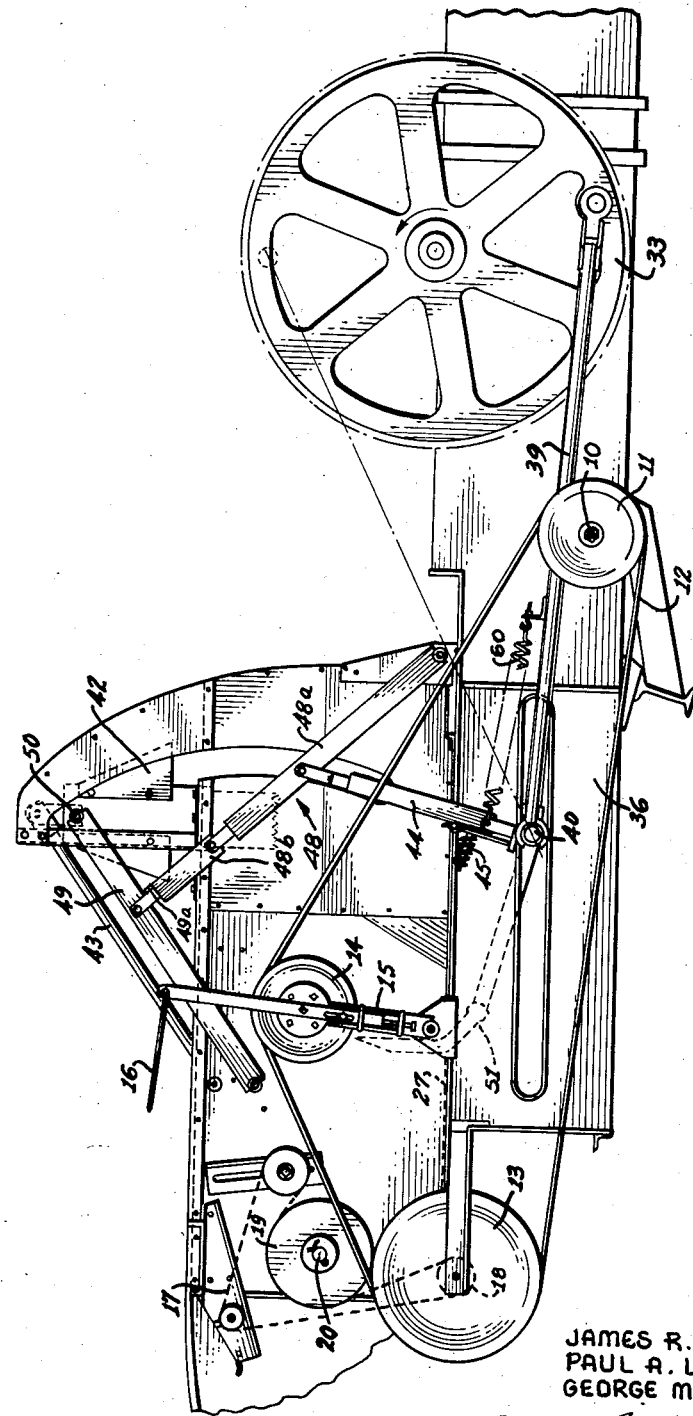
Fig. 2B is a view similar to Fig. 2A but shows the linkage, connecting rod and bull gear positions when the feed ram is at the maximum upward position of travel.

The linkage mechanism which pushes and retracts the feed ram 42 into and out of the bale chamber 36 in synchronization with the movement of plunger 35, so that the plunger will push hay to be baled into the bale chamber during the time that the plunger is near its maximum movement toward the left is shown in the Figures 2A, 2B and 2C. It is also important that this linkage provides a safety breakaway mechanism so that the feed ram 42, if it hits an obstruction or overload in its downward movement toward opening 41 of the bale chamber, which it cannot push into the bale chamber, will be caused to release. This breakaway mechanism is as previously mentioned provided in the telescoping link 44 made up of two telescoping members 44A, 44B, with the latch mechanism 45, 46, 47 and knob 44C. Features of the breakaway release mechanism are shown in detail in Fig. 4 and it is there shown that with the mechanism starting at the top of travel as shown substantially by the dotted line in Fig. 4 at which time the feed ram 42 will be close to the top of its travel and if it be assumed that immediately the connecting rod 39 pushes the cross shaft 40 of plunger 35 toward the left that the feed ram 42 (see Fig. 2C) will be so obstructed that it cannot go downwardly then nevertheless the portion 44A of link 44 will continue to travel with the connecting rod but the latch mechanism 46 will release from its knob 44C and will extend its length as shown by the solid lines in Fig. 4. However, on each cycle of movement the telescoping parts of link 44 will relatch on reaching the dotted line position of Fig. 4, as the linkage movement is limited by stop 49A, but will unlatch again if obstruction sufficient to break the latch is present. If after several cycles of movement of the plunger the obstruction is removed then the latch will hold and carry the feed ram in a normal downward travel as it latches again at each maximum movement upwardly of telescoping link. The force necessary to unlatch the latch 46 is a substantial force and selected by experimental methods as the force which would be objectionable to put upon the mechanism in normal operation. Other positions of the linkage shown in Fig. 4 indicate various positions at which the mechanism might unlatch depending upon how far down the feed ram was carried before it hit an obstruction sufficient to cause a breakaway of the latch. It is, of course, evident that it is not always a solid object which will cause the breakaway of the latch but it could be an abnormally heavy feed of material to be baled which would have become impacted in the feeding mechanism and all that would be required in this instance would be the provision of several strokes of the plunger 35 to clear the material out of the bale chamber, and allow other material to enter therein. The breakaway mechanism of the feed ram linkage together with the breakaway mechanism (Fig. 6) previously described for the feed fork 51 provides a safety mechanism for this baler which will assure its operation under normal circumstances and a major number of exceptional circumstances without excessive breakage of parts, and will prevent over-feeding of the mechanism and the correction of such over-feeding without detrimental affect on the baler itself and materially lessen the requirement for a stoppage of the machine for repairs even though they might be of a nature requiring only the replacement of shear-pins or other safety devices sometimes placed in mechanism of this type to prevent the breakage of major parts in case the mechanism is jammed by abnormal working conditions.

The linkage mechanism for controlling the movement of the feed ram is duplicated on each side of the baler, and as previously disclosed, is made up of an upper actuating link 49 having one end pivoted on a side panel of the baler and the other end pivoted on the feed ram cross shaft 50. This actuating link 49 by its swing controls the path of travel, up and down, of the feed ram 42. The up and down swinging movement of this upper actuating link 49 is controlled by a lower actuating link 48 made up of two parts 48A and 48B pivoted to break on a pivot so located as shown that the upper portion 48B of the link is substantially shorter than the lower portion 48A. The upper end of the link 48 is pivotally secured to the upper actuating link 49 near the central portion thereof and the lower end of the link 48A is pivoted to the side of the side panel of the baler. The up and down movement of the links 48 and 49 is controled by the so-called reciprocating telescoping link 44 which has the upper end thereof pivotally connected to the link 48 and the opposite lower end connected to the end of the plunger cross shaft 40 which is moving in a substantially reciprocating straight line motion. This reciprocation causes an up and down swinging movement of link portion 48A which, of course, carries with it the link 49 and feed ram 42, the desired movement for feeding.

The linkage mechanism on both sides of the baler actuated by the reciprocating movement of cross shaft 40 of plunger 35 and designed to provide vertical reciprocation of feed ram 42 has several features of construction important for the accomplishment of the desired result in the operation of the baler. Figs. 3A, 3B and 3C show the transfer chamber 26 and its relation to the feed ram. It is apparent on inspection of these views that the fork member 51 is actuated to move the material to be baled from left to right under the resiliently mounted hay holddown members 28 and its appears that the material will on its movement from left to right and as shown best in Fig. 3B be ejected into the righthand portion of the chamber under the feed ram 42. It is quite essential that a sufficient time be allowed to enable a sufficient quantity of hay to be pushed under the feed ram and therefore it is quite important that its movement be such that there be a hesitation or dwell in its movement at the top as shown in Fig. 3B as if the movement were uniform vertically up and down reciprocating with uniform motion there would not be sufficient time to get a sufficient quantity of material under the ram. It is also important that the downward travel of the feed ram once it is started be relatively positive in its movement and to push the hay into the bale chamber at a time when the plunger 35 is near its maximum position toward the left so that the opening 41 from the transfer chamber to the bale chamber will be at maximum opening and thereby be able to receive a major quantity of material. Once having pushed this material into the bale chamber it is, of course, very important that the upward movement of the feed ram 42 be fast. With these requirements in mind the type of linkage shown more in detail in Figs. 2A, 2B and 2C, has been provided. Referring to Fig. 2A the position shown provides for a downward position of the feed ram corresponding to Fig. 3A, and inspection of position of connection rod 39 and the bull gear 33 is such that the plunger 35 is at substantially its maximum travel toward the left when the linkage is in the position shown in Fig. 2A. The next position of the linkage shown is that in Fig. 2B and it will be therein noted that the angular travel of the bull gear from Fig. 2A to 2B is a little more than 90 degrees and that during such travel the feed ram has moved upwardly to the top of its travel, a relatively fast movement. It is also noted in Fig. 2B that the two parts 48A and 48B of link 48 are substantially in a straight line as shown in Fig. 2B and correspond to near the maximum vertical movement of the feed ram 42.

Referring now to an inspection of Fig. 2C there has been a movement of bull gear 33 of approximately 15 degrees and the result has been an over-center break of the two parts of link 48 as clearly shown in Fig. 2C and the reciprocating link 44 has come to an approximately vertical position from its inclined position of Fig. 2A. However, due to the over-center break in the two-part link 48 the effect on the vertical movement of the feed ram 42 has been negligible. On inspection of geometry of the figure as shown in Fig. 2C it will be apparent that continuation of bull gear 33 rotation in a counterclockwise direction would incline the reciprocating link 44 in opposite incline to that of Fig. 2A as the connecting rod carries the lower end of link 44 to the maximum travel toward the right and would again bring the two parts of link 48 toward alignment and that still there would be negligible movement of the feed ram 42. It will not be until the inclination of link 44 passes the angle of incline, as shown in Fig. 2B, on the return stroke that there will be any material downward movement of the feed ram. It has been shown therefore that the effect of the over-center break of the two-part link 48 and the performance just described will result in a hesitation in the motion of the feed ram 42, in effect holding it in its upper position for a little less than 180 degrees of rotation of bull gear after which hesitation it will move downwardly on continued rotation of the bull gear and perform its function of pushing the charge of material to be baled into the bale chamber and subsequently to be quickly retrieved and up into position again ready to receive another charge of material.

For the purpose of clarification of certain important features of operation the actuation thru the cycle of operation can be retraced again quickly first by reference to Fig. 2A where the maximum downward position of the link is shown, then by reference to Fig. 2B it is apparent the mechanism swings to bring the link 48 into longitudinal alignment and it is to be noted that the link 44 is not yet in a vertical position (at right angles to travel of reciprocating shaft 40). The link 44 therefore has been made of sufficient length that it will bring the link 48A to a longitudinal alignment prior to the time the link 44 is vertical. Reference to Fig. 2C will show that when the link 44 is brought to a vertical position it will throw the two parts 48A and 48B of link 48 out of alignment in the over-center position, which over-center movement is really an idling movement in that it causes the feed ram 42 to remain substantially stationary. This same substantially stationary position of feed ram 42 is maintained as the lower end of link 44 goes to the end of its reciprocating travel and is inclined in the opposite direction from that shown in Fig. 2B, and also in this travel there is substantially no movement of feed ram 42 and this substantially stationary position is maintained also until the link 44 comes back in its opposite travel to the inclined position shown in Fig. 2B. It is apparent therefore as marked by centerlines on Fig. 2B that in almost 180 degrees of movement of the bull gear 33 there is very little vertical movement of feed ram 42 and it is held during this inactivity in substantially its maximum upper position. This result is accomplished mainly as a result of over-center idling travel of two-part link 48 made possible in the relationship shown by selecting a sufficient length for link 44 to assure an over-center travel of the aforesaid two-part link 48.

It is assumed that many of the major features of operation of the baler will be apparent from the foregoing description but for the purpose of clarifying some points in the operation it may be well to trace the operation by following the path of the material thru the baler.

As the baler proceeds as drawn by a tractor, on which the only operator needed for the operation of the baler rides, the pickup mechanism 25 (see Figs. 1 and 7) with its ground contacting fingers picks up hay and carries it up to the auger 21, it being understood that the pickup mechanism as shown in Fig. 7 will pick up hay distributed over the entire width but that the auger 21 rearward of the pickup will move the hay toward the right as shown in Fig. 7 under the paddle wheel 22 which is an integral part of, and rotates with, the auger 21. The paddle wheel rotates in a direction such that the hay thus gathered under the paddle wheel will be pushed backwardly and downwardly against the deck 27 of transfer chamber 26. It will be remembered this transfer chamber is above the bale case 36 and that the bale plunger 35 is reciprocating under the deck 27 and the transfer chamber 26 and that the fork assembly 51 carried by the reciprocating plunger 35 intermittently projects its fork points 52, 53 and 54 into the transfer chamber 26, the path of travel of the points of the fork being shown by the oval outline in Figs. 3A, 3B and 3C. Therefore, the movement of hay in a rearward and downward direction as defined by the paddle wheel will as shown particularly by reference to Fig. 3A, very evidently press the hay against the ends of the fork as they project toward the paddle wheel, and thus pressed against the forks will in their travel very positively carry the hay rearwardly in the transfer chamber under the hold-down members 28. There is therefore a relatively uniform and continuous feeding of material under the hold-down members 28 and on thru the transfer chamber 26 toward the rear thereof. It will be remembered that the travel of the feed ram 42 is such that there is a definite dwell in the movement thereof so that in the position shown in Figs. 3B and 3C this feed ram will be in a position well above the hold-down members 28 for almost half the operating time. Therefore there is a very definite chance and opportunity for the feed of a substantial amount of hay under the feed ram during its dwell at the top of its stroke and on the quick downward movement of the feed ram the charge thus put under the feed ram will be forced into the bale case 36 thru the opening 41. It is also worthwhile noting that during this downward movement of feed ram 42 the ends of the fork 51 will be, for the majority of the time, traveling under the deck 27 and therefore will not be feeding material against the ram during its downward movement. The feed through the transfer chamber will be at a minimum during the aforementioned portion of cycle due to the lack of push by the feeding fork 51. There will of course be some tendency for movement as some force on the hay is exerted by the paddle wheel 22 but by far the most positive force will be that exerted by the feeding fork 51.

The safety features of the mechanism have been previously mentioned but it may be well to mention that the provision of resilient connections in both the feeding fork 51 mechanism and the feed ram 42 linkage assures that in case of obstruction and very excessive overloads the major portions of the mechanism, such as bale plunger 35, can continue to operate and the bale plunger 35 will continue to push material out of the way in the bale case while the feeding fork 51 and the feed ram 42 are inactive, thus giving an opportunity for the mechanism to clear itself. If it does clear itself the feed ram linkage as well as the feeding fork connection will again bring these mechanisms into play to feed material into the bale case for continuation of normal operations after the obstruction has been removed. However, if a real obstruction, such as a stone or other foreign object, is the cause of the stoppage the mechanism will simply fail to operate with no major damage, except of course under exceptional circumstances such as obstruction in the path of the plunger.

It is important that the telescoping parts 44A and 44B of the reciprocating link relatch at each stroke of the feed ram and therefore the feed ram makes an attempt by successive blows from above to feed material into the bale case on each stroke of the plunger. The feed ram unlatches only when obstruction is great enough to cause such result. Such successive blows of the feed ram are very effective in clearing an obstruction. In fact the partial strokes are a major factor in clearing an overload and generally accomplish such result without any assistance from the operator other than control of the tractor or the rod 16 of the pickup.

It is also an important part of the overload control that the drive for the pickup mechanism 25 and the auger 21 as well as the paddle wheel 22 are separately driven from the pulley 13 and that the operator can stop the pickup mechanism entirely independent of the operation of the remainder of the baler by merely pulling on the rod 16 which extends to a position which can be reached from the tractor seat. This stopping of the pickup mechanism which can be coincident with the stopping of forward movement of the tractor and baler gives the operator opportunity to quickly and easily clear an overload in the baler caused by unevenness in the windrow or other variation in the material picked up.

Although we have described our invention by reference to a specific disclosure found practical in actual operation, it is not our intention to be limited thereto but to make variation therein within the scope of the following claims.

We claim:

1. A baler feed mechanism comprising a pickup unit positioned at the front of the baler to pick up material from the ground, an auger horizontally rotatable behind said pickup unit and positioned to transfer material substantially at right angles to the path of material carried thru said pickup unit, a paddle wheel at the transfer end of said auger whereby material is moved to said paddle wheel by said auger and fed rearwardly and pressed downwardly from said paddle wheel, a transfer chamber behind said paddle wheel to which said material is transferred by said paddle wheel, a bale case under said transfer chamber, a reciprocable baling plunger in the bale case, a feeding fork pivoted on and reciprocable with the said plunger and extending into said transfer chamber in feeding movement with the baling stroke of said plunger and retracted from said transfer chamber on the opposite stroke of said plunger.

2. A baler feed mechanism comprising, a bale case and an adjacent material transfer chamber, a reciprocating plunger in said bale case, a feeding fork carried by and actuated with the reciprocations of said plunger to assist in feeding material in said transfer chamber, a feed ram movable into and out of said bale case in synchronism with the movement of said plunger, and resilient connections provided for said feeding fork and said feed ram, whereby on encountering an obstruction either said feeding fork or said feed ram will resiliently deflect from normal movement without injury to said mechanism and relatch automatically on the removal of said obstruction.

3. A baler feed mechanism as set forth in claim 2 wherein there is provided in each said resilient connection a return mechanism to assure repositioning to operating position of said feeding fork and said feed ram near the initial feeding movement in each cycle of operation in synchronism with the stroke of said plunger regardless of whether or not there is a release in each cycle on encountering of an excessive obstruction, whereby said feeding fork and said feed ram will continue to exert successive feeding strokes on said material intermittently on each cycle of movement to assist in clearing said obstruction.

4. A baler feed mechanism comprising, a bale case and an adjacent material transfer chamber, a reciprocating plunger in said bale case, a feeding fork carried by and actuated with the reciprocations of said plunger to assist in feeding material in said transfer chamber, a feed ram movable into and out of said bale case thru said transfer chamber adjacent to and in material feeding relation to said fork, a connecting linkage for effecting movement of said feed ram in synchronism with the movement of said plunger, said linkage comprising a latch releasable on predetermined load imposed by excessive obstruction encountered in the downward movement of said feed ram and said latch arranged to relatch on each cycle of movement of said linkage in synchronism with said plunger, whereby said feed ram exerts successive blows on material being fed prior to release of said latch and on encountering said obstruction to assist in removing said obstruction.

5. In a feed mechanism for a baler of the character described having a reciprocating plunger for compacting material to be baled in a bale case in front of said plunger, a feed ram, a linkage for moving said feed ram into and out of said bale case in front of said plunger to feed material thereto comprising an upper actuating link pivoted to swing said feed ram in an arc into and out of said bale case, a two-part actuating link oppositely inclined and having an end thereof secured to said upper actuating link, and a telescoping breakaway link having one end pivoted to the lower member of said two-part link and an opposite end pivoted to reciprocate with said plunger, and said telescoping breakaway link provided with resilient releasing and relatchable latch mechanism allowing normal operation at a fixed length and breakaway extended length on abnormal load encountered by said feed ram.

6. In a feed mechanism for a baler of the type having a bale case with a plunger reciprocated therein by connecting rods driven by rotating members positioned rearwardly and outside the bale case, casing members defining a transfer chamber adjacent to and above the bale case, a feeding fork pivoted on and reciprocating with the plunger, and resilient yielding connections holding an angular relationship between said pivoted fork and said connecting rods whereby the varying angularity of said connecting rods move said feeding fork into and out of operable contact with material in said transfer chamber to feed material during one direction of movement of said plunger and retracting said fork on the opposite direction of movement.

7. In a feed mechanism for a baler of the type having a bale case with a plunger reciprocated therein by outside connecting rods driven by rotating members rearwardly and outside the bale case, a feeding fork pivoted to and reciprocated with the plunger to assist in feeding material to an opening in the bale case, resilient connections holding said pivoted feeding fork in defined angular position with the tilting movement of said connecting rods whereby said feeding fork is tilted into and out of feeding engagement by the aforesaid tilting movements of said connecting rods.

8. A baler feed mechanism comprising, a bale case, a reciprocable plunger in said bale case and having an adjacent transfer chamber for moving material to be baled around said plunger from the front of the baler to an inlet in the bale case for contact by said plunger, a rotatable bull gear on said bale case rearwardly of said transfer chamber and said inlet opening, a connecting rod on the outside of the bale case connecting said bull gear with said plunger thereby to convert rotating motion of said bull gear to reciprocating motion of said plunger, a feed ram operable to swing into and out of the opening in said bale case in the rear section of said transfer chamber, and said feed ram actuated in synchronism with the movement of said plunger by a linkage connected to be actuated by reciprocation of said plunger, said linkage reproduced on both sides of baler and having a link thereof pivotally connected to projecting portions of said plunger, and further linkage members providing variation in travel of said feed ram with a dwell in movement near the uppermost position of said feed ram whereby material in said transfer chamber is moved under said feed ram during said dwell in movement.

9. A baler feed mechanism of the character described having a feed ram for assisting the insertion of material to be baled into a bale case having a reciprocating plunger for compacting said material, a combination of linkage for controlling the movement of said feed ram and including a link having an end thereof pivoted to and reciprocating with said plunger, a two-part link with an upper part and a lower part thereof pivotally connected together, said lower part connected to the upper end of said reciprocating link, an upper actuating link secured to the end of the upper part of said two-part link and connected to swing said feed ram to its upper position when said two parts are near alignment and when said reciprocating link is in slightly inclined position approaching the vertical position and is still not at the end of its travel, said reciprocating link coming to the end of its travel on further incline in the opposite direction from the vertical thereby to bring said two-part link over-center and again to near alignment on return movement, said movement of said two-part link over-center and return as aforesaid producing in effect a dwell in the vertical movement of said upper actuating link and said feed ram and subsequent movement on opposite reciprocating stroke of said reciprocating link and said plunger.

10. A mechanism as defined in claim 9 wherein a stop is provided between the upper part of said two-part link and said actuating link limiting over-center deflection of said two-part link and substantially coincident with the linkage position at the end of travel of said reciprocating link.

11. A mechanism as defined in claim 10 wherein a breakaway latch is provided associated with said reciprocating link combining telescoping sections of said reciprocating link providing variation in length during cycle of operation, a latch hook on one of said telescoping sections, a knob on the other of said telescoping sections to coact with said latch hook, resilient means set to release said latch on obstruction of travel of said feed ram and urging said latch and knob to latch when said telescoping sections again come to normal length, said latch and knob positioned to latch when contact of said stop causes said telescoping parts to assume normal length at end of each stroke of said reciprocating link at over-center position and contact of said stop.

12. A baler feed mechanism comprising, a pickup unit, an auger behind said pickup unit, said auger positioned to transfer material substantially at right angles to the path of material carried thru said pickup unit and terminating in a paddle wheel member whereby material is fed rearwardly and pressed downwardly, a casing determining a transfer chamber behind said paddle wheel to which said material is transferred by said paddle wheel, resilient hold-down members in the upper part of said transfer chamber under which said paddle wheel feeds material, a bale case under said transfer chamber, an opening in the bale case at the rearward section of said transfer chamber, a reciprocable plunger in the bale case, a feed ram operable to swing into and out of the opening in the bale case and thru said transfer chamber at substantially right angles to the movement of said plunger from a position above said hold-down members, a feeding fork pivoted on and reciprocable with said plunger and extending thru slots into said transfer chamber for feeding movement with the baling stroke of said plunger and retracted from said transfer chamber on the opposite stroke of said plunger, a rotatable bull gear on said bale case rearwardly of said transfer chamber said feed ram and said feed opening, a connecting rod from said rotatable bull gear to said plunger to transfer rotating motion of said bull gear to reciprocating motion of said plunger, a linkage actuated by reciprocation of said plunger for moving said feed ram.

13. A baler feed mechanism as in claim 12 wherein a connection is provided between said connecting rod and said feeding fork holding angular relationship therebetween whereby tilting movement of said connecting rod projects said fork into said transfer chamber on baling stroke of said plunger and retracts said fork on opposite stroke of said plunger.

14. A baler feed mechanism comprising a pickup unit, an auger behind said pickup unit, said auger positioned to transfer material substantially at right angles to the path of material carried thru said pickup unit and terminating in a paddle wheel member whereby material is fed rearwardly and pressed downwardly, a casing determining a transfer chamber behind said paddle wheel to which said material is transferred by said paddle wheel, resilient hold-down members in the upper part of said transfer chamber under which said paddle wheel feeds material, a bale case under said transfer chamber, an opening in the bale case at the rearward section of said transfer chamber, a reciprocable plunger in the bale case, a feed ram operable to swing into and out of the opening in the bale case and thru said transfer chamber at substantially right angles to the movement of said plunger from a position above said hold-down members, a feeding fork pivoted on and reciprocable with said plunger and extending thru slots into said transfer chamber for feeding movement with the baling stroke of said plunger and retracted from said transfer chamber on the opposite stroke of said plunger, a rotatable bull gear on said bale case rearwardly of said transfer chamber said feed ram and said feed opening, a connecting rod from said rotatable bull gear to said plunger to transfer rotating motion of said bull gear to reciprocating motion of said plunger, a linkage actuated by reciprocation of said plunger for moving said feed ram, said linkage comprising a reciprocating link pivoted on and reciprocable with said plunger, a two-part link actuated by said reciprocation link to a position near aligning said two link parts when said feed ram is near its upper travel and said reciprocating link is not yet vertical with reference to the path of the plunger in its travel, an upper actuating link secured to one of the parts of said two-part link and connected to swing said feed ram to its upper position when said two parts are aligned as aforesaid, and when said reciprocating link is in slightly inclined position approaching the vertical and not to the end of its reciprocable travel, said two-part link deflecting to an over-center position when said reciprocating link comes to a substantially vertical position and still not to the end of travel, said reciprocating link coming to the end of its travel on further incline in opposite direction from vertical to bring said two-part link again to near alignment on return movement, said movement of said two-part link over-center and return as aforesaid producing in effect a dwell in the vertical movement of said upper actuating link and said feed ram followed by relatively fast downward movement of said feed ram on subsequent movement in continuing reciprocating stroke of said reciprocating link and said plunger.

References Cited in the file of this patent

UNITED STATES PATENTS

| | | |
|---|---|---|
| 682,514 | Wilson | Sept. 10, 1901 |
| 1,072,069 | Wygant | Sept. 2, 1913 |
| 2,349,847 | Crumb | May 30, 1944 |
| 2,417,309 | Lisle et al. | Mar. 11, 1947 |
| 2,478,324 | Russell | Aug. 9, 1949 |
| 2,548,559 | Ronning et al. | Apr. 10, 1951 |
| 2,627,714 | Freeman et al. | Feb. 10, 1953 |

FOREIGN PATENTS

| | | |
|---|---|---|
| 1,047,198 | France | July 22, 1953 |
| 155,337 | Australia | Feb. 19, 1954 |